(12) United States Patent
Martin et al.

(10) Patent No.: US 7,125,539 B2
(45) Date of Patent: Oct. 24, 2006

(54) GROUND CALCINED ALUMINA FOR INPUT IN A PRECURSOR COMPOSITION FOR REFRACTORY MATERIAL AND METHOD FOR OBTAINING SAME

(75) Inventors: Nicolas Martin, Aix en Provence (FR); Christian Barthelemy, Voiron (FR)

(73) Assignee: Aluminium Pechiney, Paris Cedex (FR)

( * ) Notice: Subject to any disclaimer, the term of this patent is extended or adjusted under 35 U.S.C. 154(b) by 235 days.

(21) Appl. No.: 10/491,897

(22) PCT Filed: Oct. 17, 2002

(86) PCT No.: PCT/FR02/03550

§ 371 (c)(1),
(2), (4) Date: Apr. 15, 2004

(87) PCT Pub. No.: WO03/033405

PCT Pub. Date: Jan. 24, 2003

(65) Prior Publication Data

US 2004/0247520 A1    Dec. 9, 2004

(30) Foreign Application Priority Data

Oct. 18, 2001  (FR) ................... 01 13450

(51) Int. Cl.
*C01F 7/02* (2006.01)
(52) U.S. Cl. ..................................... 423/625

(58) Field of Classification Search ............... 423/625; 524/265, 266, 430, 437
See application file for complete search history.

(56) References Cited

U.S. PATENT DOCUMENTS

| | | |
|---|---|---|
| 5,252,655 A | 10/1993 | Parker et al. |
| 5,541,249 A | 7/1996 | Hughes et al. |
| 5,543,173 A | 8/1996 | Horn, Jr. et al. |
| 5,916,536 A | 6/1999 | Deville et al. |
| 6,916,870 B1 * | 7/2005 | Barthelemy et al. ........ 524/265 |

FOREIGN PATENT DOCUMENTS

| | | |
|---|---|---|
| DE | 198 28 257 | 12/1999 |
| EP | 1220042 | 7/2002 |
| FR | 2807749 | 10/2001 |

* cited by examiner

*Primary Examiner*—Timothy C. Vanoy
(74) *Attorney, Agent, or Firm*—Dennison, Schultz & MacDonald

(57) ABSTRACT

The invention concerns an additive-containing ground calcined alumina used as constituent of a refractory material precursor characterized in that it comprises an organofunctional silane, the organic function being typically an epoxy function, an alkyl function, an alcohol function or a diol function. Preferably said organofunctional silane is an oxyranyl-alkyl-silane, of chemical formula $C_9H_{20}O_5Si$. Said additive-containing alumina can be obtained by adding said organofunctional silane during grinding to take advantage of its anti-caking properties, the intimate and homogeneous mixture being obtained as a result of grinding. It may also result from a post-grinding mixing.

15 Claims, No Drawings

GROUND CALCINED ALUMINA FOR INPUT IN A PRECURSOR COMPOSITION FOR REFRACTORY MATERIAL AND METHOD FOR OBTAINING SAME

This application is a filing under 35 USC 371 of PCT/FR02/03550 filed Oct. 17, 2002.

TECHNICAL DOMAIN

The invention relates to a ground calcined alumina designed to be used in the composition of a precursor for a refractory material and a method for obtaining the said ground calcined alumina. More particularly, the invention relates to aluminas intended for the production of refractory materials for which no special sintering capability is required, and which are used particularly for producing refractory concrete.

STATE OF THE ART

Calcined aluminas are formed mainly from more or less friable agglomerates of elementary particles of alpha alumina, called crystallites. They are distinguished by the diversity of their applications resulting from the wide variety of their properties related particularly to their purity, and the size and morphology of crystallites and their ratio of transformation into alpha alumina or alphanisation ratio—which itself depends on the degree of calcination of the alumina.

After calcination, aluminas are in the form of crystallite agglomerates with an average diameter of between 50 and 100μ. Calcined aluminas are usually ground, in order to obtain the characteristics searched for in some markets (mainly ceramics and refractories). The alumina obtained after grinding has the required size grading distribution. Depending on the grinding intensity, the agglomerates are broken, releasing smaller aggregates, or even isolated crystallites.

This type of alumina is usually calcined in the presence of a mineralising agent that firstly enables a lower alphanisation temperature and secondly has an influence on the size and shape of the crystallites obtained. Thus, the use of fluorine, typically at a proportion of between 0.001% and 0.2% by volume in the atmosphere of the calcination furnace, enables an alphanisation temperature of between 900° C. and 1300° C., and preferably between 1000 and 1200° C. With this type of mineralising agent, it is difficult to industrially obtain particles with a crystallite size exceeding 4μ or correspondingly, particles with a BET surface area (according to standard NF 12-621) less than 0.4 $m^2/g$.

Ground calcined alumina required by refractory engineers must have a number of working properties, related firstly to their slurry flowability, and secondly to their ability to retain as little water as possible (water intake) such that the porosity of the refractory products obtained is low and does not cause any unacceptable degradation of their mechanical characteristics.

The water intake expressed in this case in ml of water per 100 g of alumina, must be as low as possible; as the amount of water that can be absorbed by the powder increases, the porosity created on the refractory product also increases, and the mechanical characteristics worsen. It is measured by adding a quantity of water on a given mass of alumina powder until a single cohesive mass is obtained. In general, water intake reduces when grinding increases; working properties are improved.

Flowability of a slurry is measured by observing the flow time in a mould. This must be very short and everything must be done to avoid sedimentation of the mix. A container with a given volume and in which there is an orifice with a fixed aperture is filled. This container is turned over and the time necessary to "empty" it is measured. The measured evacuation flow must be as high as possible. In general, the flowability of a slurry is quantified by the time necessary for a given quantity of slurry to flow out of the said container, this said slurry itself being derived from a mix of constituents added in given proportions. The slurry flow time reduces as grinding is increased.

In current methods of obtaining ground calcined aluminas with satisfactory water intake and flowability properties, either the alumina has to be calcined at high temperatures exceeding 1300° C., or the nature and/or proportions of the mineralising agent have to be changed. Regardless of which solution is chosen, it follows that the manufacturing cost of these aluminas will be significantly increased for refractory applications due to the modification and/or high maintenance necessary for calcination furnaces.

Problems that Arises

Therefore, the applicant attempted to develop a method capable of obtaining a ground calcined alumina under economically satisfactory industrial conditions enabling an acceptable flowability and water intake, and satisfying working criteria defined by refractory engineers.

Purpose of the Invention

A first purpose of the invention is a method for obtaining a ground calcined alumina to be used in the composition of a precursor for a refractory material in which an alumina hydrate is calcined at a temperature of between 800° C. and 1300° C. for a period of half an hour to 4 hours, preferably in the presence of a halogenated compound acting as a mineralising agent, characterised in that the calcined alumina obtained is ground in the presence of an organofunctional silane, the organic function typically being an epoxy function, an alkyl function, an alcohol function or a diol function. Particularly satisfactory results have been obtained using an oxyranyl-alkyl-silane with chemical formula $C_9H_{20}O_5Si$.

The halogenated compound acting as a mineralising agent is preferably a fluorinated compound chosen from among the fluorine, hydrofluoric acid, aluminium trifluoride and alkaline fluorides group. In gaseous form, it may be introduced and mixed in the furnace atmosphere. It may also be dispersed in the alumina trihydrate filler in gaseous form, in the form of an aqueous solution or in solid form. A mineralising agent is added such that the alumina at the output from the furnace contains 20 to 80 g of fluorine per tonne of Al2O3. The addition of the mineralising agent generates a slightly fluorinated atmosphere in the furnace, the proportion of halogenated gas being between 0.001% and 0.2% by volume.

The applicant has observed that the said organofunctional silane, for which the use had initially been envisaged as an anti-caking grinding additive, had surprisingly resulted in improved working properties of the calcined alumina obtained under typical production conditions. This additive is mixed with calcined alumina in very low proportions (0.01% to 1% by weight of the calcined alumina mass), which has the advantage that it does not modify, or it only slightly modifies, the chemical properties of the alumina made in this way. Preferably, the proportion of organofunctional silane is chosen to be between 0.01% and 0.1%.

Therefore the solution proposed by this invention consists of not modifying calcination conditions, which is always expensive and involves risks (risk of changing the chemical properties of the alumina used), but rather of modifying the grinding conditions by using a very small quantity of additive.

Another purpose of the invention is ground calcined alumina obtained by the previously described method. It is a ground calcined alumina containing an additive used as a component of a refractory material precursor, characterised in that it comprises an organofunctional silane, the organic function typically being an epoxy function, an alkyl function, an alcohol function or a diol function. Preferably, the said organofunctional silane is an oxyranyl-alkyl-silane, with chemical formula $C_9H_{20}O_5Si$.

The ground calcined alumina is in the form of particles covered by a nanometric layer of the said organofunctional silane. The said organofunctional silane is in the alumina containing additive in the proportion of 0.01% to 1% by weight, and preferably in the proportion of 0.01% to 0.1% by weight.

An analysis procedure has been developed to determine the proportion of organofunctional silane contained in the alumina containing additive; a gaseous phase chromatography analysis is carried out and the mass spectrum is determined for each chromatogram extraction peak (see example 4).

The size of crystallites is the size normally obtained with a fluorinated mineralising agent and a calcination temperature of between 1100° C. and 1250° C., and the resulting D50 is less than 4μ.

The ground calcined alumina containing an additive has significantly lower water intake properties and significantly shorter slurry flow times than what would be obtained without the additive. However, these values are relative, and depend particularly on grinding conditions; grinding in batch or continuous grinding, grinding duration. Example 1 describes values obtained after batch grinding in 60 liter mills. Regardless of the grinding duration (to obtain an alumina with an average particle diameter of 6μ, 5μ or 4μ), it is observed that the slurry flow time is always less than 25 s, while it is more than 28 s with an additive-free alumina.

Example 2 shows higher values obtained after continuous grinding. Under continuous grinding conditions, it is found that the slurry flow time is close to 35 s regardless of the grinding duration, while it is of the order of 70 s with an additive-free alumina. Thus, an improvement due to the additive is observed regardless of whether grinding is done by batch or continuously, resulting in the slurry flow time characterising the product flowability being divided by not less than 2.

Another purpose of the invention is a ground calcined alumina containing an additive used as a component of a refractory material precursor characterised in that it comprises an organofunctional silane, the organic function typically being an epoxy function, an alkyl function, an alcohol function or a diol function. Preferably, the said organofunctional silane is an oxyranyl-alkyl-silane with chemical formula $C_9H_{20}O_5Si$.

This alumina with additive may be obtained by adding the said organofunctional silane during grinding so as to benefit from its anti-caking properties, and the intimate and homogenous mix is obtained by grinding.

But it could also be the result of mixing after grinding. In this case, organofunctional silane added to the alumina must be introduced such that the mix obtained is as homogenous as possible. A batch or continuous mixer can be used after adding the organofunctional silane to the ground calcined alumina, by spraying with an atomiser or a volumetric pump.

EMBODIMENTS OF THE INVENTION

Example 1

Batch Grinding of Calcined Aluminas 1.1 Batch Grinding of Alumina With or Without the Presence of Different Additives This is an alumina calcined starting from Bayer hydrargillite reference AC34 made by ALUMINUM PECHINEY (99.6% of alumina, 2500 ppm soda, 100 ppm silica, 160 ppm lime, 120 ppm of iron sesquioxide). The average size of crystallites is 2.7μ. The D50 of particles before grinding is close to 70μ.

The additives used are glycerol, amines, polymethacrylate, pyrogenated silica and silane. The silane chosen is an oxyranyl-alkyl-silane with formula $C_9H_{20}O_5Si$.

9 kg of alumina AC34 are poured into a 60-liter batch mill. The batch mill is rotated around its axis of rotation at 40 rpm. The rotating batch mill is filled with 19 mm diameter grinding balls. The total mass of balls introduced into the mill is 45 kg. The tested additive is then added. The grinding duration is determined so as to obtain an average particle diameter equal to 4μ (ground calcined alumina reference AC34B4 made by ALUMINIUM PECHINEY). The grinding duration in this case is close to 4 hours.

The following table shows the results of measurements carried out on the calcined alumina thus ground. These measurements apply to properties searched for by refractory engineers; water intake and the time necessary for a slurry occupying a volume of 150 cubic centimeters to flow from a cylindrical container (40 mm diameter). The slurry is a mix of 250 g of alumina and 60.5 g of aqueous solution with 10 g/l of a deflocking agent. The cylindrical container has a bottom in which there is a 6 mm diameter central orifice through which the slurry will flow.

|  | without additive | +0.05% amine | +0.05% glycerol | +0.05% polymeta-crylate | +0.05% pyro-genated silica | +0.05% silane |
|---|---|---|---|---|---|---|
| WATER INTAKE (ml/100 g) | 20 | 18 | 18 | 18 | 19 | 15 |
| Slurry FLOW-ABILITY Flow time (s) | 28 | 37–48 | 29 | 20 | 26 | 10 |

Silane is distinguished from other additives by a significant improvement in working properties recommended for the production of refractory materials; the water intake is 25% lower than the water intake with the same additive-free ground calcined alumina, and the slurry flowability expressed as the slurry flow time is divided by a factor of almost 3.

1.2 Batch Grinding of Different Calcined Aluminas

Two aluminas calcined starting from Bayer hydrargillite, reference AC34 and AC44 respectively made by ALUMINUM PECHINEY, were measured in this example. AC34 contains 99.6 of alumina and AC44 contains 99.5% of alumina. Both contain 100 ppm of silica, 160 ppm of lime, 120 ppm of iron sesquioxide. The essential differences between the two are the soda content (2500 ppm for AC34 and 4000 ppm for AC44) and their size grading (the D50 of AC44 particles before grinding being close to 45μ).

These calcined aluminas were ground in the batch mill in the previous example for several different durations, so as to obtain average diameters of 6μ, 5μ and 4μ. They were ground firstly without an additive, and secondly with 0.05% of oxyranyl-alkyl-silane $C_9H_{20}O_5Si$.

Batch grinding conditions are identical to those described in example 1.

| D50 after grinding | 4 μ | | 5 μ | | 6 μ | |
|---|---|---|---|---|---|---|
| | without additive | 0.05% silane | without additive | 0.05% silane | without additive | 0.05% silane |
| WATER INTAKE (ml/100 g) | | | | | | |
| Na2O: 2500 ppm | 20 | 15 | 20 | 17 | 22 | 17 |
| Na2O: 4000 ppm | 16 | 15 | 17 | 15 | 19 | 16 |
| Slurry FLOW-ABILITY (s) | | | | | | |
| Na2O: 2500 ppm | 28 | 10 | 34 | 14 | 48 | 14 |
| Na2O: 4000 ppm | 32 | 12 | 33 | 13 | 40 | 18 |

This test confirms that the organofunctional silane used as an additive significantly improves the required properties, regardless of which calcined alumina is used and regardless of the grinding duration. Thus, the slurry flowability (expressed as a duration) is more than 28 seconds and in any case is always more than 25 seconds when the calcined alumina is additive-free. It is less than 18 seconds, and in any case is always less than 25 seconds when it is an alumina with an additive.

When the soda content is high (4000 ppm), the effect of the additive has the greatest influence on the calcined alumina that was ground the least.

Example 2

Continuous Grinding of Calcined Alumina

Continuous grinding is a less expensive method than batch grinding, both in terms of consumed energy and labour cost. This provides a means of proposing large quantities of ground calcined aluminas at minimum cost. A ball mill equipped with an output selector is used; when the grain size is greater than the selector cut-off diameter, it is re-entered at the mill inlet for a new pass. In this example, an AC34 calcined alumina (reference ALUMINUM PECHINEY described in example 1) is ground continuously in order to obtain an AC34B6 ground calcined alumina, with an average particle diameter of 6μ.

The mill in this example operates at a production rate of 5 tonnes/hour. Its internal diameter is 2.10 m and its length is 8 m. The internal lining and the grinding load (20 tonnes of 30 mm diameter balls) are made of alumina. The rotation speed is equal to 22 rpm, and it uses a VENTOPLEX ALPINE selector (registered trademark).

The additive (oxyranyl-alkyl-silane $C_9H_{20}O_5Si$) was added at the mill feed at a flow of 500 g per hour, corresponding to an additive content of 0.05% by weight. The properties measured on the calcined alumina ground in this way confirm the advantage provided by this additive. Thus, the slurry flowability measured as the flow time to empty a 150 cubic centimeter container is equal to 33 seconds, while it was equal to 70 seconds for the same additive-free ground calcined alumina.

Example 3

Post-grinding Mix

A mass of 30 grams of additive (oxyranyl-alkyl-silane) was added to 60 kg of AC34B6 ground calcined alumina by spraying using an atomiser. The additive and the alumina were mixed for one hour in a batch mixer. The capacity of the mixer used, a V shaped TURBULA made by MORITZ, is 100 liters. It is made to rotate at a rotation speed of 600 turns/hour.

The flow time of the slurry made from the mix thus obtained to empty a 150 cubic centimeter container, is equal to 35 seconds while it was 70 seconds for the same ground calcined alumina not mixed with silane.

Example 4

Characterisation of Alumina with Additive

Gaseous phase chromatography and mass spectrometry are combined.

With gaseous phase chromatography, compounds are separated as a function of their boiling temperature and their affinity for a solid phase.

After separation in gaseous phase chromatography, compounds are fragmented by electronic impact. Each fragment is then separated in an electromagnetic field and is identified, to deduce the structure of the initial molecule.

Extraction of organic compounds:

15 g of alumina powder is added into a cellulose cartridge; extraction is done using a Soxtec, by which the sample can be immersed in 80 ml of boiling methanol (30 minutes), and then by lifting the extraction cartridge, rinsing the sample by the reflux solvent (45 minutes).

The extract is concentrated to 1.5 ml at low pressure and is then injected in gaseous phase chromatography coupled with a mass spectrometer.

Chromatograms are obtained: showing extraction peaks (isomers) of silane as a function of the retention time. For oxyranyl-alkyl-silane $C_9H_{20}O_5Si$, these peaks are obtained for retention times equal to 21.92 min., 22.17 min. and 22.36 min.

The mass spectrum of silane (mass/charge) is determined for these retention times. The spectrum contains characteristic peaks at 91, 109, 121, 139, 147, 205 and 237 AMU (Atomic Mass Units).

Knowing the silane mass spectrum, total ionic currents and ionic currents specific to silane can be obtained for alumina with and without silane.

For alumina with additive, all molecular fragments characteristic of silane make signals above the base line after between 20 and 22 minutes of retention.

Advantages
- Improved alumina working properties;
- Chemistry of calcined aluminas not disturbed as a result of very small quantities of mineralising agent and additive;
- No generation of dust during grinding;
- No clogging of powder on the mill walls.

The invention claimed is:

1. Ground calcined alumina with an additive comprising between 0.01 and 1% by weight of an organofunctional silane.

2. Ground calcined alumina with additive according to claim 1, in which said organofunctional silane contains an organo function which is an epoxy function, an alkyl function, an alcohol function or a diol function.

3. Ground calcined alumina with additive according to claim 1, in which the organofunctional silane is an oxyranyl-alkyl-silane, with chemical formula $C_9H_{20}O_5Si$.

4. Ground calcined alumina with additive according to claim 1, with a slurry flowability, expressed as the time taken to empty a cylindrical container containing 150 cubic centimeters of a slurry, equal to at least half the value obtained for ground calcined alumina without the additive.

5. Ground calcined alumina with additive according to claim 1, containing between 0.01% and 0.1% of said organofunctional silane.

6. Method for obtaining a ground calcined alumina comprising calcining an alumina hydrate at a temperature of between 800° C. and 1300° C. for a period of half an hour to 4 hours, and grinding the calcined alumina in the presence of an organofunctional silane.

7. Method according to claim 6, in which the alumina is calcined in the presence of a halogenated compound acting as a mineralising agent.

8. Method according to claim 7, in which the halogenated compound acting as a mineralising agent is a fluorinated compound selected from the group consisting of fluorine, hydrofluoric acid, aluminium trifluoride and alkaline fluorides group.

9. Method according to claim 8, in which the mineralising agent generates a slightly fluorinated atmosphere in a proportion of halogenated gas of between 0.001 and 0.2% by volume in a furnace in which the calcining takes place.

10. Method according to claim 6, in which said organofunctional silane contains an organic function which is an epoxy function, an alkyl function, an alcohol function or a diol function.

11. Method according to claim 6, in which the said organofunctional silane is an oxyranyl-alkyl-silane, with chemical formula $C_9H_{20}O_5Si$.

12. Ground calcined alumina with additive obtained using the method according to claim 6, comprising between 0.01 and 1% by weight of an organofunctional silane.

13. Ground calcined alumina with additive according to claim 12, in which the organofunctional silane contains an organic function which is an epoxy function, an alkyl function, an alcohol function or a diol function.

14. Ground calcined alumina with additive according to claim 12, in which the organofunctional silane is an oxyranyl-alkyl-silane, with chemical formula $C_9H_{20}O_5Si$.

15. In a method for preparing a precursor for a refractory material comprising the steps of calcining alumina and grinding the calcined alumina to obtain a desired particle size, the improvement comprising grinding the calcined alumina in the presence of an organofunctional silane.

* * * * *